S. C. BELDING.
TRAP NEST.
APPLICATION FILED AUG. 19, 1920.

1,395,942.

Patented Nov. 1, 1921.
2 SHEETS—SHEET 1.

Witness
J. R. Hoge

Inventor
S. C. Belding
By H. B. Willson &co
Attorneys

S. C. BELDING.
TRAP NEST.
APPLICATION FILED AUG. 19, 1920.
1,395,942.
Patented Nov. 1, 1921.
2 SHEETS—SHEET 2.
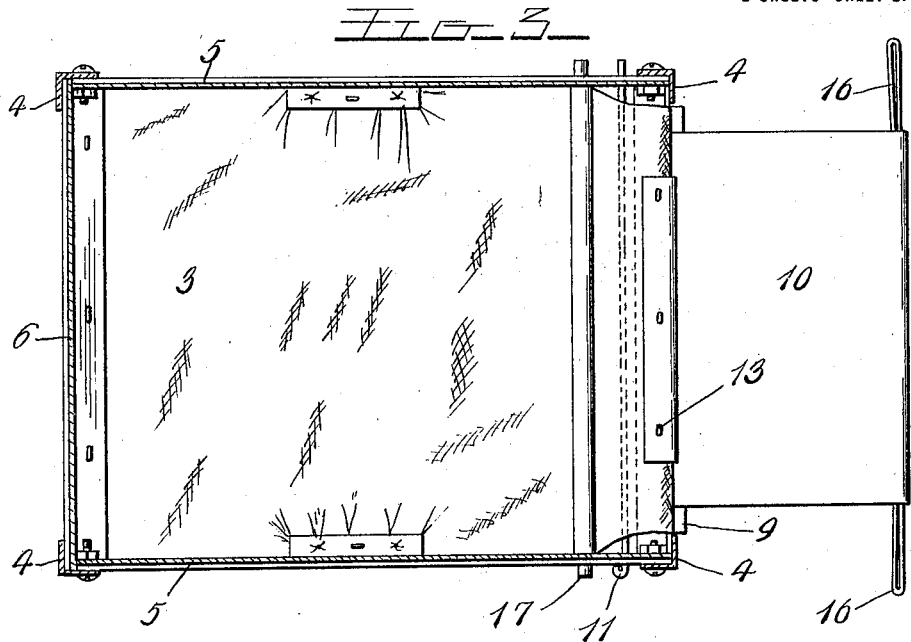
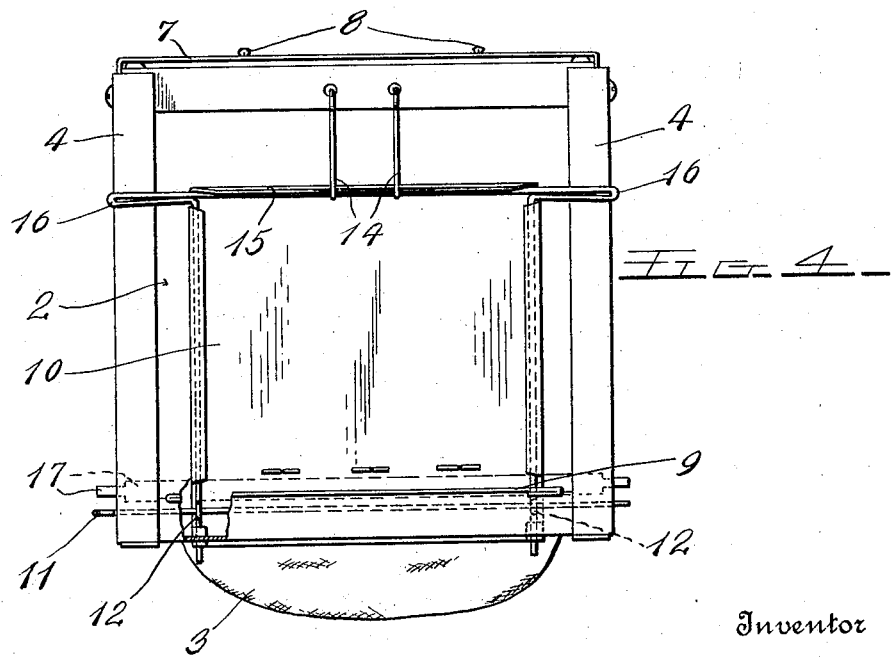
Inventor
S. C. Belding
Witness
J. R. Hoge

UNITED STATES PATENT OFFICE.

SAMUEL C. BELDING, OF MASON CITY, IOWA.

TRAP-NEST.

1,395,942. Specification of Letters Patent. Patented Nov. 1, 1921.

Application filed August 19, 1920. Serial No. 404,506.

*To all whom it may concern:*

Be it known that I, SAMUEL C. BELDING, a citizen of the United States, residing at Mason City, in the county of Cerro Gordo and State of Iowa, have invented certain new and useful Improvements in Trap-Nests; and I do declare the following to be a full, clear, and exact description of the invention, such as will enable others skilled in the art to which it appertains to make and use the same.

This invention relates broadly to improvements in nests for chickens, and it has more particular reference to a device of this class commonly known as a trap nest, which type of nest permits the hen to enter the same and remain therein without being annoyed by other hens, and enables the owner to determine what hens are laying and what hens are not laying by simply marking the various ones, taking their numbers as they leave the nest, and examining the nest to see if any eggs have been laid by that particular hen.

Another object of the invention is to provide a nest in which the construction is such that the hen is prevented from releasing herself until the latch mechanism, which retains the door in closed position, is released by hand, after which the door will swing to open position and permit the hen to leave the nest.

A further object of the invention is to provide a device of this class which is constructed of comparatively few and inexpensive readily disconnectible parts which permits it to be taken apart and assembled very easily, and at the same time renders it comparatively inexpensive to both the manufacturer and the user.

Other objects and advantages of the invention will be apparent during the course of the following description.

In the accompanying drawings forming a part of the specification and in which like numerals are employed to designate like parts throughout the same:

Fig. 3 is a horizontal section taken on the line 3—3 of Fig. 2, looking in the direction of the arrows.

Fig. 4 is a front end elevation of the device, showing door closed and locked.

Figure 1:
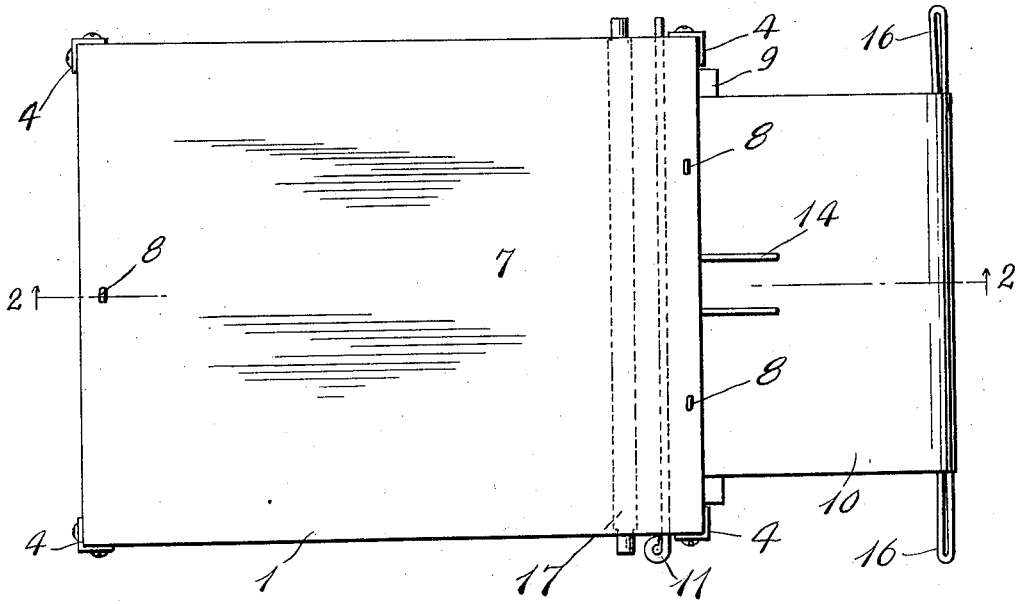
Figure 1 is a top plan view of a nest constructed in accordance with my invention.
Figure 2:
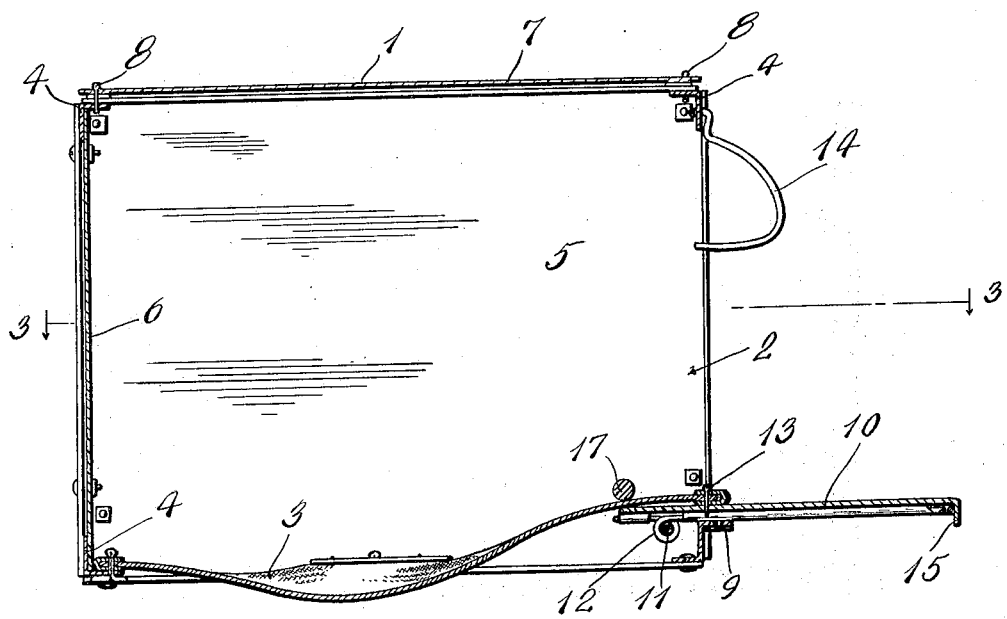
Fig. 2 is a central vertical longitudinal sectional view taken on the line 2—2 of Fig. 1.

In carrying out my invention, I employ a casing which is open at one end and is provided with a depressible bottom, preferably of fabric to form a soft seat for the hen, the open end being closed by a door which is moved to closed position by the bottom which is connected therewith and which causes such closing when the weight of the hen is upon it. Within the casing is a suitable perch on which the hen may stand in order to remove weight from the bottom and permit the door to swing to open position. A latch is employed to retain the door in closed position, and the door and latch are of such construction that it is not possible for the hen to release the latch herself and cause the door to assume its open position, therefore, an effective trap is insured.

Referring to the drawings wherein I have disclosed the preferred construction which I employ, it will be seen that the numeral 1 designates the casing which is open at one end as indicated at 2, the same including a depressible and yieldable bottom 3 of canvas or some other similar fabric. This casing may be made in various ways, however, by preference it is to be made in the manner clearly shown in the drawings. To explain it comprises a rectangular frame made from a plurality of angle members 4 which are detachably connected together by suitable securing means, this securing means in some instances serving to retain the side walls 5 in position. The rear end wall 6 is retained in position in any suitable way and the top wall 7 is, by preference, removably secured in position by cotter pins or the like 8. At this point I wish to state that one of the angle members 4 at the front end of the casing includes a forwardly extending ledge or rest 9 which serves a purpose to be hereinafter described.

For the purpose of closing the open end 2 of the casing, I employ a downwardly swinging removable door 10 which is moved to closed position by means of the bottom 3, which is connected thereto and which is depressed when the hen is on it, as is obvious. This door may be mounted in various ways, but I prefer to mount it in such a way that it may be easily and readily removed, because it is sometimes desirable to remove it for the purpose of cleaning it out or changing the bottom. The mounting means here employed consists of a horizontally disposed removable pivot pin 11 which extends through the side walls 5 and through the eyes 12 carried by the door. To permit such removal of the door the end of the fabric bottom adjacent the same is detachably connected to the door by means of cotter pins or other suitable members 13. With this construction it will be seen that by disconnecting the fabric bottom from the door and by removing the pivot pin 11 the door may be entirely removed and the device will then allow the bottom to sag, making it easy of access for cleaning or removing the bottom and replacing it.

As clearly shown in Fig. 4, the door is of less area than the opening in the front end of the casing. I employ a door of this size because I desire to provide a space between the upper edge of the door and the top of the casing. This space permits the hen to extend her head through it, thus the attendant will know that the hen is ready to leave the trap, so he will release the door from closed position. It is desirable to provide means for supporting the weight of the animal so the weight will be taken off of the bottom and permit the door to swing open. This means is preferably in the form of a horizontally disposed transversely extending perch 17 arranged in the casing adjacent to the open end thereof.

The latch 14 is pivotally connected to the upper member 4 at the front end of the casing and its free ends engage the lateral flange 15 on the upper edge of the door, this flange serving as a shoulder for the latch which holds the door securely closed and forms a complete trap. Since it is also desirable to limit the upward swinging movement of the door, I provide the latter with oppositely disposed stops 16 which engage the casing and limit such movement.

The door 10 is normally in open position so as to permit a hen to readily enter the casing, and as this door rests on the ledge 9 it serves as an entrance platform for the hen as she walks along it and into the casing. Upon walking onto the fabric bottom 3 which is then rather taut, this bottom sags and decreases in length in such a way as to raise the door and move it to closed position, in which position it is retained by means of the latch 14 which is automatically moved to effective position. The hen having laid her egg and seeing the light, will have her desire to get out of the nest and in so doing will get up on the perch 17, after which the latch may be lifted from the outside, her number recorded, and the hen released.

From the foregoing description taken, in connection with the accompanying drawings, the construction, operation, and mode of using my improved trap nest will be readily apparent to those skilled in the art to which the invention appertains, therefore, a more lengthy description is deemed unnecessary.

The construction shown and described is preferable and will well obtain the results for which the invention is particularly designed. However, I do not desire to limit myself to this particular construction and I wish it to be understood that various minor changes in the shape, size, and arrangement of parts may be resorted to without departing from the spirit of the invention or the scope of the subjoined claims.

I claim:

1. A nest of the type set forth comprising a casing, open at one end and at its bottom, a piece of fabric material closing said open bottom, and a downwardly swinging door for closing the open end of the casing, one end of said piece of fabric material being connected to said door, whereby the latter will be moved to closed position when said piece of material is depressed by the weight of a hen in the nest.

2. A nest of the type set forth comprising a casing, open at one end and at its bottom, a piece of fabric material secured at one of its ends and its opposite edges to the adjacent walls of the casing and closing said bottom, an apertured reinforcing strip secured to the opposite free end of said piece of fabric, and a downwardly swinging door for closing the open end of the casing, said door being provided with apertures, and quickly removable retaining pins passing through the apertures in said reinforcing strip and door for connecting said piece of fabric to the door, whereby the latter will be closed when said piece of fabric is depressed by the weight of a hen.

3. A device of the class described comprising a casing, open at one end and open at its bottom, being provided at said open end and adjacent its top with an apertured bar, a piece of wire passed through said apertures and bent between its ends to provide a substantially U-shaped latch, the arms of which are curved, a door closing the open end of said casing, being pivoted to the latter at its lower end and being provided at its upper end with a lateral flange, said latch being engageable with said flange for retaining the door in closed position, and a depressible bottom arranged in the remaining opening of said casing and connected with said door for actuating the latter.

4. A device of the class described comprising a casing, open at one end, a door for closing said open end, a rod passing through the side walls of the casing adjacent said open end and the bottom of the casing, a length of relatively stiff wire connected to said door and bent to provide a pair of vertical attaching arms, the latter being bent between their ends to provide eyes through which said rod passes, and a depressible bottom for the casing connected to the door for operating the latter when depressed by a hen.

5. The structure set forth in claim 4, said door being of less area than the open end of the casing and said length of wire being also bent to provide a lateral stop for engaging the end of the casing and limiting the upward swinging of said door.

In testimony whereof I have hereunto set my hand.

SAMUEL C. BELDING.